(12) United States Patent
Law et al.

(10) Patent No.: US 8,090,989 B2
(45) Date of Patent: Jan. 3, 2012

(54) SYSTEM AND METHOD FOR BI-DIRECTIONAL DEBUGGING OF COMPUTER

(76) Inventors: Gregory Edward Warwick Law, Cambridge (GB); Julian Philip Smith, Oxford (GB)

( * ) Notice: Subject to any disclaimer, the term of this patent is extended or adjusted under 35 U.S.C. 154(b) by 926 days.

(21) Appl. No.: 12/090,974

(22) PCT Filed: Oct. 11, 2006

(86) PCT No.: PCT/GB2006/050324
§ 371 (c)(1),
(2), (4) Date: Apr. 21, 2008

(87) PCT Pub. No.: WO2007/045920
PCT Pub. Date: Apr. 26, 2007

(65) Prior Publication Data
US 2008/0301417 A1 Dec. 4, 2008

(30) Foreign Application Priority Data
Oct. 21, 2005 (GB) .................................. 0521465.5

(51) Int. Cl.
*G06F 11/00* (2006.01)
(52) U.S. Cl. .......................... 714/35; 717/130; 714/38.1
(58) Field of Classification Search ........................ None
See application file for complete search history.

(56) References Cited

U.S. PATENT DOCUMENTS

| | | | |
|---|---|---|---|
| 5,428,618 A * | 6/1995 | Ueki et al. | 717/124 |
| 5,784,552 A * | 7/1998 | Bishop et al. | 714/38.12 |
| 5,870,607 A * | 2/1999 | Netzer | 717/127 |
| 6,101,524 A * | 8/2000 | Choi et al. | 718/102 |
| 6,901,581 B1 * | 5/2005 | Schneider | 717/124 |
| 7,506,318 B1 * | 3/2009 | Lindo et al. | 717/130 |
| 2004/0216092 A1 * | 10/2004 | Ayers et al. | 717/135 |
| 2004/0268310 A1 * | 12/2004 | Morgan | 717/124 |

OTHER PUBLICATIONS

Lewis, Bill, "Debugging Backwards in Time", Oct. 9, 2003, Fifth Int. Workshop on Automated and Algorithmic Debugging.*
International Search Report for corresponding PCT/GB2006/050324; completed Jun. 1, 2007 by Yaniv Sabbah (attached).
Pan D Z et al: "Supporting Reverse Execution of Parallel Programs"; Sigplan Notices USA, vol. 24, No. 1, Jan. 1989, pp. 124-129, XP002435056 ISSN: 0362-1340 (entire document).
Georges A et al: "Jarec: A Portable Record/Replay Environment for Multi-Threaded Java Applications"; Software Practice & Experience, Wiley & Sons, Bognor Regis, GB, vol. 34, No. 6, May 2004, pp. 523-547, XP001192644, ISSN: 0038-0644 (entire document).

(Continued)

*Primary Examiner* — Gabriel Chu

(57) ABSTRACT

The present invention relates to debugging of computer programs, and in particular to bi-directional debugging.
A method of returning to a state in the history of execution of a computer program, said state comprising a set of values of one or more of registers of a processor on which the program is running, working memory space to which the program has access and operating system resources allocated to the program, the method comprising: identifying in machine code representing said program, instances of machine code instructions associated with substantially non-deterministic events; modifying said program machine code to execute a program instrumentation set of machine code instructions to handle said substantially non-deterministic events; executing said modified program machine code, storing a time series of said states during said executing; restoring a said stored state; and executing said modified program machine code forward in time starting at said restored state to return to said state in said program history of execution.

16 Claims, 6 Drawing Sheets

OTHER PUBLICATIONS

Stuart I Feldman and Channing B Brown: "Igor: A System for Program Debugging via Reversible Execution"; Proceedings of the ACM SIGPLAN and SIGOPS Workshop on Parallel and Distributed Debugging, XX,XX, 1988 pp. 112-123, XP0022166957, p. 115, line 1-p. 119, line 40 (Abstract).

Cornelis: "A Taxonomy of Execution Replay Systems'" International Conference on Advances in Infrastructure for Electronic Business, Education, Science, Medicine, and Mobile Technologies on the Internet, 2003, page CDROM Paper 59, XP002435057 (entire document).

Steven Allen Lewis: "Technique for Efficiently Recording State Changes of a Computer Environment to Support Reversible Debugging"; Thesis, Graduate School of Florida, 2001, p. 1-78, XP002435058 (pp. 23, line1-16, p. 3, line 11-last line, p. 9, line 14-p. 10, line 2).

* cited by examiner

```
.section .data
buf:

.section .text
.globl main
main:

mov   $buf, %ecx   #ecx points at buf
.start:

mov   $3, %eax     #do syscall #3 (read)
  mov   $0, %ebx     #from fd 0 (stdin)
  mov   $1, %edx     #read a single char
  int   $0x80        #make the system call mov   $4, %eax     #do syscall #4 (write)
  mov   $1, %ebx     #to fd 1 (stdout)
                     #ecx still at buff
                     #edx still contains 1
  int   $0x80        #make the system call cmpb  $10, buff    #did user hit enter?
  jne   .start       #if not, round again
  ret
```

Figure 2

SYSTEM AND METHOD FOR BI-DIRECTIONAL DEBUGGING OF COMPUTER

The present invention relates to debugging of computer programs, and in particular to bi-directional debugging.

When writing computer programs it is sometimes the case that errors, or 'bugs', are included in a program. Sometimes this is due to typographical errors in writing the source code (e.g. omitting a character or substituting one character for another), sometimes due to implementing incorrect functionality (e.g. causing a loop to terminate at one when it ought to terminate at zero) and sometimes due to errors in other programs upon which the author is relying, for example a library routine or even the compiler itself.

A debugger can help someone attempting to find and remove bugs from a program. Prior art debuggers have tended to focus upon inserting so-called breakpoints into a program and running a program forwards in time, stopping at one or more of the breakpoints in order to examine the state of the program (content of processor registers, content of memory) at that breakpoint in the hope of catching an error before it causes the program to crash. Crashing can take many forms, generally summarised as the program not running as intended, for example a segmentation fault, an unhandled exception or an infinite loop (where a program stops responding to user input and executes the same routines indefinitely). An example of such a prior art debugger is GDB, the GNU Project Debugger.

However, the cause of an error in a program may occur long before the error manifests itself. This makes such forward debugging difficult, as it may not be obvious which particular change in program state caused an error, especially if it occurred a long time previous to the error actually showing up, with many correct program operations in the intermediate period. Furthermore, some errors are more easy to spot than others, as in general a computer simply does what it is programmed to do, and the cause of the error may lie in the user's understanding of how it works, as distinct from how it actually works. On the other hand, a user may have a correct understanding of how his program is intended to work, but if there are errors in a library routine upon which he is relying (for example a mathematical square root function), then the program may give the wrong result even though the parts of the program written by the user are functioning as the user intended. In this case there are two options for correcting the error; the first is to correct the error in the library routine (which may not always be possible as a user may not always have access to the source code of library routines) and the second is to provide a 'workaround' in the user's program to ensure that the error in the library routine does not cause his own program to give the wrong results.

For these reasons and others it would be useful to be able to step backwards in the execution of a computer program so as to be able to trace an error from the moment it caused the program to crash back until the error first appeared. This is impossible with conventional prior art debuggers as these only allow forward execution of programs. Backwards execution is actually a hard problem to solve, as in the process of executing a program there may be intermediate results which are lost as the program executes, making it difficult to return to a previous state unless a record is kept of these results. Furthermore, due to the operation of jump instructions in a program, it can impossible to tell, without keeping a record of program execution, where execution was taking place in a program prior to the current position. It could have been executing the instruction before the current one, or it could have just executed a jump instruction somewhere else which caused execution to jump to the current position. In addition, with variable length instruction sets such as Intel IA32 it may not be possible to trace execution backwards at all without keeping some kind of record, since there is no way of knowing whether the previous instruction was a one byte instruction just before the current position, or a two byte instruction two places before the current position, and so on.

One solution to the problem of backwards debugging is described in the paper "Efficient Algorithms for Bidirectional Debugging" (Boothe, 2000 ACM SIGPLAN Conference on Programming Language Design and Implementation, Vancouver, British Columbia). This describes a source code C and C++ debugger running on Digital/Compaq Alpha based UNIX workstations. It describes embedding event counters into the program being debugged and using these counters to identify a target event on the fly as the target program executes.

However there are a number of problems with this approach. Firstly, as it operates on the source code of a program not the object code, if a problem occurs with a program for which the source code is not available, it will not be possible to debug the program using this method. Secondly, if a problem occurs due to the functioning of the compiler itself, it may not be possible to detect the problem as the program is not compiled in its 'normal' form at all—instead a modified version of the program including debug routines is compiled, in which the problem with the compiler may not manifest itself, or may manifest itself in a completely different way. Thirdly, this method avoids the problem of variable length instruction set formats completely, as it operates on source code not object code. It does not provide a solution at all to the problem of debugging object code containing variable length instructions, such as are contained in programs written or compiled for the Intel IA32 series of processors. Fourthly, different debugger programs would have to be written for debugging source code written in different programming languages, and it does not provide a solution at all for the problem of debugging programs written in assembly language or machine code.

It would be advantageous to provide a debugger capable of backwards debugging as well as forwards debugging which overcomes all of the above-cited problems.

According to an aspect of the present invention, there is provided a method of returning to a state in the history of execution of a computer program, said state comprising a set of values of one or more of registers of a processor on which the program is running, working memory space to which the program has access and operating system resources allocated to the program, the method comprising identifying in machine code representing said program, instances of machine code instructions associated with substantially non-deterministic events, modifying said program machine code to execute a program instrumentation set of machine code instructions to handle said substantially non-deterministic events, executing said modified program machine code, storing a time series of said states during said executing, restoring a said stored state, and executing said modified program machine code forward in time starting at said restored state to return to said state in said program history of execution.

This allows debugging by stepping backwards and debugging by jumping to an arbitrary point in a program's execution history. Debugging is provided by a technique of snapshot and replay. To deal with operations such as system calls, non-deterministic instructions (e.g. RDTSC on Intel IA32), handling of asynchronous signals and handling of thread switches, a technique of record/replay can be employed to record the results of such an operation the first time a program is executed, and replay the results on the second and subsequent times the program is executed.

Thread switches can be handled by using thread 'multiplexing' to get deterministic threading. This can potentially lead to 'deadlock' situations, which can be overcome by using UNIX signals and EINTR feature to multiplex threads that block. Some system calls have known results, so only these results need be recorded. However, other system calls may have unknown or unpredictable results, so in order to replay these later the state of the whole system after executing a system call may be recorded by use of snapshots.

Shared memory presents an additional problem, as memory may be written to by the target program and also by another program(s). In order to record these memory transactions so as to be able to replay them later, the processor may map shared memory read-only, and record transactions on memory faults. An alternative shared memory strategy would be to instrument memory reads and writes as for machine code instructions associated with non-deterministic events.

Storing snapshots may take up a lot of memory, especially for programs which need to run for a long time before encountering an error, so snapshot thinning may be used to reduce the number of snapshots stored. As the program executes, snapshots taken a long time in the past may be selectively discarded, provided they are not snapshots taken, for example, as a result of a system call. For example, snapshots taken more than 10 seconds ago may be discarded so that one in ten snapshots is retained. Snapshots taken more than 100 seconds ago may be discarded so that one in one hundred snapshots is retained, and so on.

In addition to registers of a processor on which the program is running, working memory space to which the program has access and operating system resources allocated to the program, the exact number of executed instructions may be recorded. This may be used to determine which state is returned to in the history of execution of the computer program. Alternatively, the state may be determined by a register value, such as the program counter, or the stack pointer, or a data register such as an accumulator. It may also be determined by the number of blocks of deterministic instructions executed in the history of execution of the computer program.

In some preferred embodiments the method includes inputting one or more said search criteria for identifying a state in the history of execution of the program; identifying a most recent said stored state matching one or more search criteria; and searching forward in time from said most recent stored state to determine a most recent said state in said history of execution of said program matching said one or more search criteria. Thus is embodiments broadly the current is, once the most recent point at which the state was identified going back and play forwards once again to that state. For example: we have been executing our program for 2 s; we have a snapshot at 1 s, and the criteria match at 1.5 s into the program's history. We go back to 1 s, and play forwards to 1.5 s, where we detect that the search criteria are met. We need to continue play forwards from 1.5 s to 2 s, just in case there is a more recent time in the program history when the criteria are met that is, how do we know 1.5 s is the only time the criteria are met? When we get to the end of the program history, we then know that 1.5 s was definitely the most recent time the criteria were met. So, we go back to the snapshot at 1 s, and play forwards once again to 1.5 s.

According to another aspect of the present invention there is provided a method of going back from a point in the execution of a program to an earlier point in the execution of the program, the method comprising capturing and storing a series of snapshots of the execution of the program, a said snapshot comprising a set of values of one or more of registers of a processor on which the program is running, working memory space to which the program has access and operating system resources allocated to the program, inputting one or more search criteria to identify said earlier point in the execution of the program, executing said program forward from a first said snapshot to search for an earlier point in said execution meeting said one or more search criteria, and executing said program forward from a previous said snapshot to search for said earlier point in said execution meeting said one or more search criteria if said searching from said first snapshot is unsuccessful.

According to a further aspect of the present invention there is provided a method of monitoring computer program code execution of a processor connected to a memory, the method comprising partitioning the computer program code into first portions of code comprising instructions for linear computer program code execution and second portions of code comprising instructions for non-linear computer program code execution, executing said computer program code by executing a said first portion of code and by evaluating to which point in the computer program code a said second portion of code following said executed first portion of code would, if executed, transfer execution, and continuing executing of said computer program code at that point, and storing at least one snapshot of computer program code execution during said executing, said snapshot comprising at least one of register values of the processor and memory values of the memory.

According to a yet further aspect of the present invention there is provided a method of going to an arbitrary point in computer program code execution of a processor connected to a memory, said arbitrary point being determined by a selection criterion, the method comprising partitioning the computer program code into first portions of code comprising instructions for linear computer program code execution and second portions of code comprising instructions for non-linear computer program code execution, executing said computer program code by executing a said first portion of code and by evaluating to which point in the computer program code a said second portion of code following said executed first portion of code would, if executed, transfer execution, and continuing execution of said computer program code at that point; storing at least one snapshot of computer program code execution during said executing, said snapshot comprising at least one of register values of the processor and memory values of the memory, and selecting a said snapshot, restoring register values of the processor and memory values of the memory to those in the snapshot and continuing execution from that point until the selection criterion has been met, to go to said arbitrary point.

Preferably the snapshot contains values of substantially all (or all used) registers; preferably the snapshot contains values of substantially all (or all used) memory values (in the memory space for the program). Preferably the snapshot contains values of substantially all (or all used) operating system resources.

According to another aspect of the present invention there is provided a method of going to an arbitrary point in computer program code execution of a processor connected to a memory, said arbitrary point being determined by a selection criterion, the method comprising partitioning the computer program code into first portions of code comprising instructions for linear computer program code execution and second portions of code comprising instructions for non-linear computer program code execution, executing the first portions of code, evaluating at which point in the computer program code the second portions of code would transfer execution and continuing execution at that point, until the selection criteria have been met, to go to said arbitrary point.

According to a further aspect of the present invention there is provided a carrier carrying first computer program code for implementing a method of going to an arbitrary point in execution of a second computer program on a processor connected to a memory, said arbitrary point being selectable by a selection criterion, the first computer program code comprising a module for partitioning the second computer program into first portions of code comprising instructions for linear computer program code execution and second portions of code comprising instructions for non-linear computer program code execution, a module for executing said computer program code by executing a said first portion of code and by evaluating to which point in the computer program code a said second portion of code following said executed first portion of code would, if executed, transfer execution, and continuing execution of said computer program code at that point, a module for storing snapshots of computer program code execution, each snapshot comprising at least one of register values of the processor and memory values of the memory, a module for selecting a snapshot and restoring register values of the processor and memory values of the memory to those in the snapshot, and a module for continuing computer program code execution from a snapshot until said selection criterion has been met.

These and other aspects of the present invention will now be further described, by way of example only, with reference to the accompanying drawings in which:

FIG. 2 shows an example Linux program.

We will describe bidirectional debugging—a technique where the complete state of a running computer program can be examined at any point in that program's history. This requires a mechanism to 'unwind' the program's execution. The naïve way of approaching this problem is to record every state transition a program makes. However, this would result in the recording of enormous amounts of data. Instead, we describe a mechanism whereby a 'snapshot' is periodically taken of a program as it runs. To determine the program's state at a given time t in its history, we start with the snapshot taken most recently before time t, and execute the program forwards from that snapshot to time t.

Figure 1:
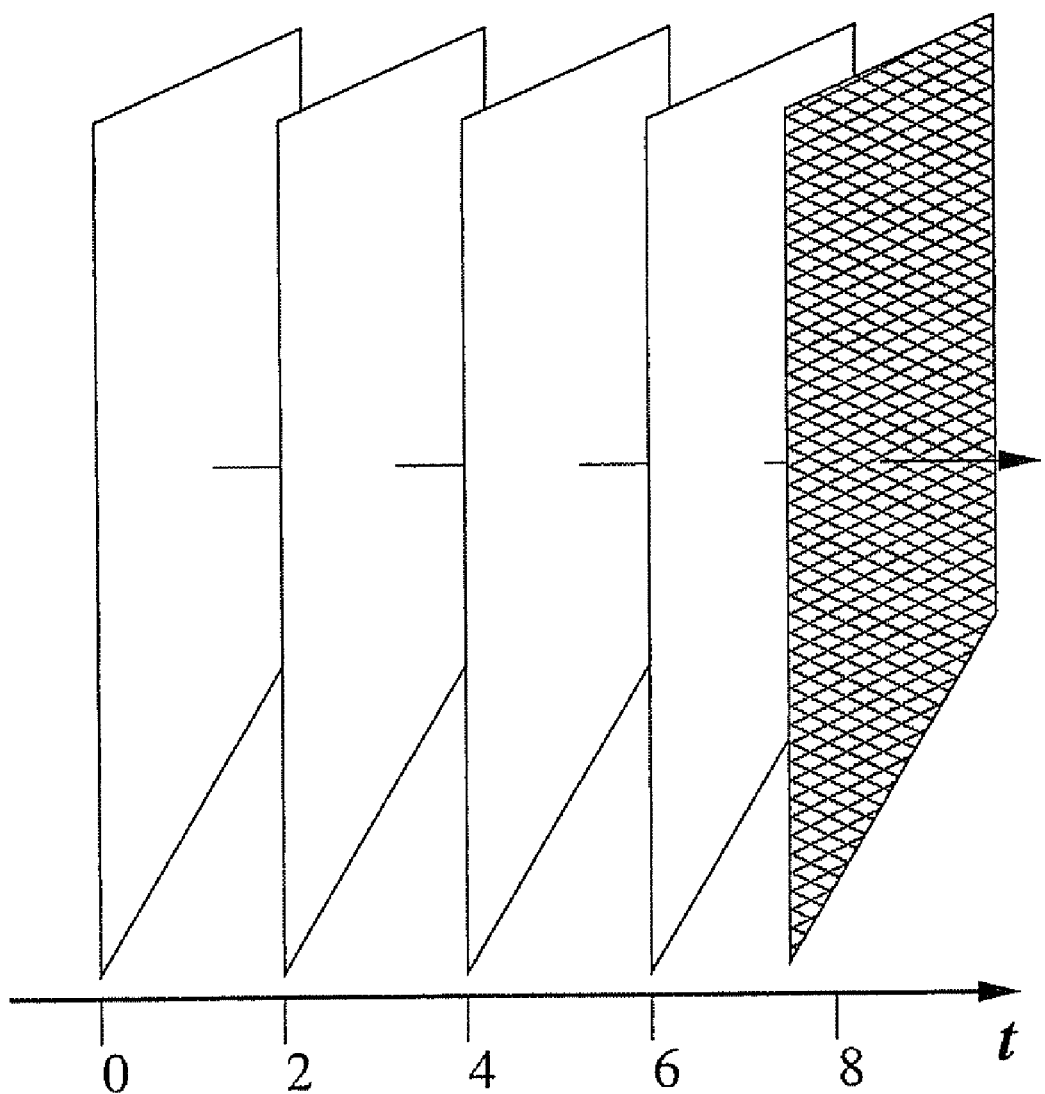
FIG. 1 shows a running program with snapshots at regular 2 second intervals according to the present invention.

For example, FIG. 1 depicts a program under execution. The program has been running for a little over 7 seconds, with snapshots having been taken every 2 seconds. In order to find the state of this program at t=5 s the snapshot taken at 4 s is replayed for 1 s. We rely on the inherent determinism of a computer to ensure that the when the snapshot of the program is replayed to time t, it will have exactly the same state as had the original program at time t.

We observe that the UNIX fork system call provides a convenient mechanism to snapshot a process.

Unfortunately, while a computer itself is deterministic, computer programs do not run deterministically, due to nondeterministic inputs. That is, when we say a computer is deterministic we mean that given the same set of inputs, it will always run through the same state changes to the same result. Therefore, to ensure that a snapshot of a program is replayed exactly as the original, we must ensure that exactly the same inputs are provided to the replayed program as were provided to the original.

Fortunately, most modern, 'protected' operating systems provide a sanitised 'virtual environment' in which programs are run, commonly referred to as a process. A key feature of processes is that they strictly limit the computer resources that are accessible to a program, making it practical to control all sources of nondeterminism that may influence a program's execution. These resources include the memory that is accessible by the process, as well as operating system resources, such as files and peripherals. We define all such resources as the process state. The memory and register set of a process make up its internal state, while operating system resources that it may access make up its external state. The controlled environment of a process means that with the help of instrumentation (see section 3) it is practical to eliminate all sources of nondeterminism during the process' execution.

We have identified three sources of nondeterminism for a computer process executing on a protected operating system:

Nondeterministic instructions are instructions which may yield different results when executed by a process in a given internal state. The most common form of nondeterministic instruction is the system call (i.e. the instruction used to make a request of the operating system). For example, if a process issues a system call to read a key press from the user, the results will be different depending on which key the user presses. Another example of a nondeterministic instruction is the Intel IA32 rdtsc instruction, which obtains the approximate number of CPU clock ticks since power on.

Asynchronous events are events issued to the process from the operating system that are not the direct result of an action of that process. Examples include a thread switch on a multithreaded system, or a timer signal on a UNIX system.

Shared memory is memory that is accessible by more than one process. If a process' memory may be written by another, since the two processes operate independently, this will result in nondeterminism.

For the bidirectional debugging implementation described in section 1 to work, the aforementioned sources of nondeterminism must be eliminated entirely. To achieve this, all nondeterministic events are recorded as the debugged process executes. When replaying from a snapshot in order to obtain the program's state at some earlier time in history, the recorded nondeterministic events are faithfully replayed. The mechanism used to employ this is described in the following section.

We employ a technique of machine code instrumentation in order to record and replay sources of nondeterminism. Our instrumentation is lightweight, in that it modifies the instrumented program only slightly, and is suitable for use with variable length instruction sets, such as Intel IA32.

We instrument by intercepting control flow at regular intervals in the code. Sections of code between interception are known as basic blocks. A basic block contains no control flow instructions, and no nondeterministic instructions—that is, a basic block contains no jumps (conditional or otherwise) or function calls, nor system calls or other nondeterministic instructions. Control flow and nondeterministic instructions are therefore termed basic block terminators.

An instrumented program is run such that all the basic blocks are executed in the same order and with the same results as would be the case with its equivalent uninstrumented program. The instrumentation code is called between each basic block as the instrumented program executes. Each of the program's original basic blocks are copied into a new section of memory, and the basic block terminator instruction is translated into one or more instructions that ensure the instrumentation code is called before control continues appropriately.

As an example, consider the Linux program shown in FIG. 2, written in Intel IA32 assembler (using GNU/AT&T syntax):

This simple program reads characters from stdin, and echos them to stdout. The program contains four basic blocks, terminated respectively by the two int $0x80 instructions, the jne and the ret instruction at the end.

For convenience, we term the uninstrumented program P, and its instrumented equivalent P'. For each basic block there is an uninstrumented basic block $B_n$, and a corresponding instrumented basic block $B'_n$.

Figure 3:
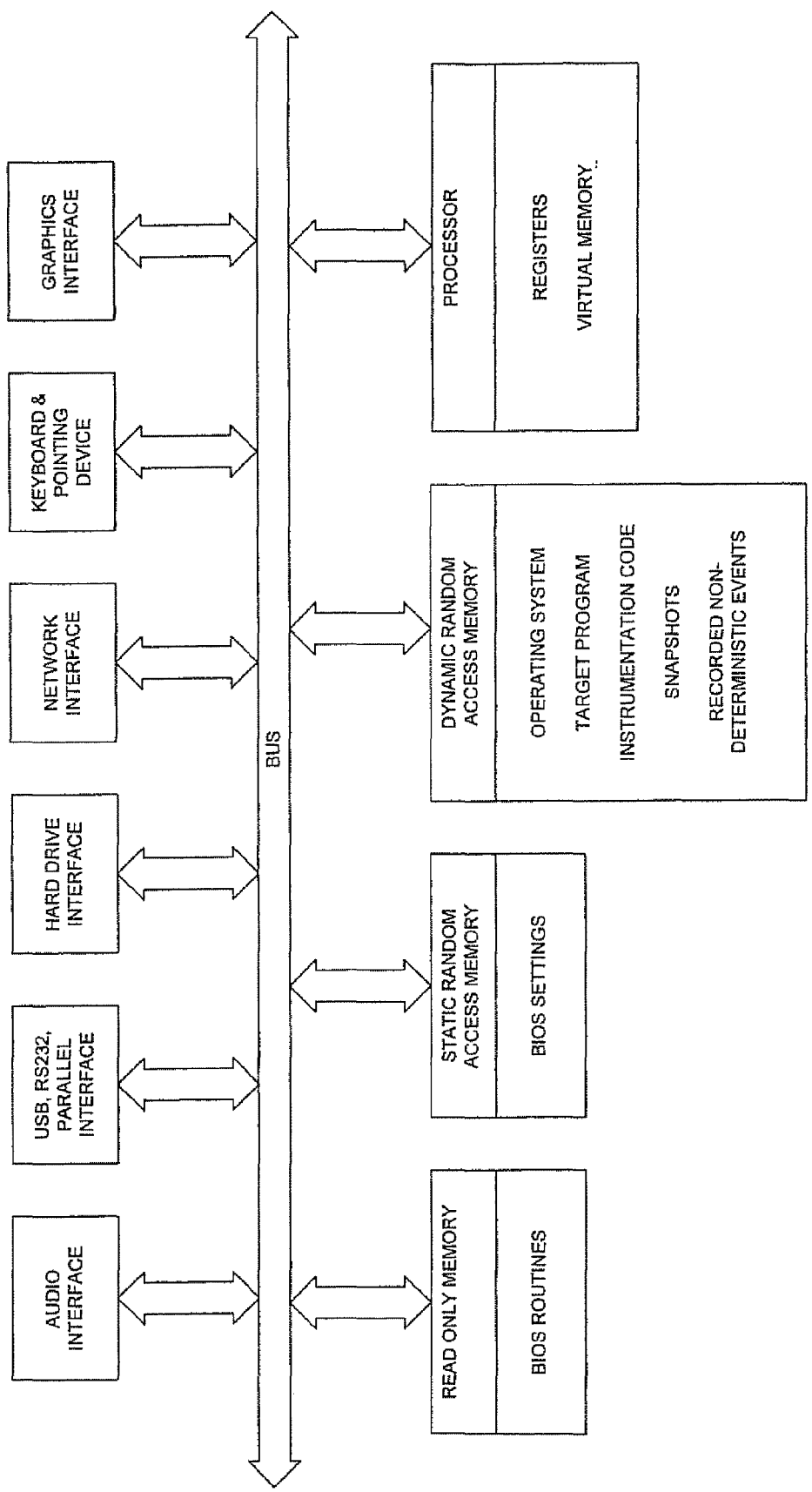
FIG. 3 shows an example of a computer system

FIG. 3 shows an example of a computer system on which the program may be executed and on which bi-directional debugging may be performed. The target program and the debugger both reside in physical memory. Processor registers may be captured and stored in snapshots along with memory used by the target program process. The debugger may operate within the virtual memory environment provided by the processor and the operating system, or it may operate on a single process computer.

Figure 4:
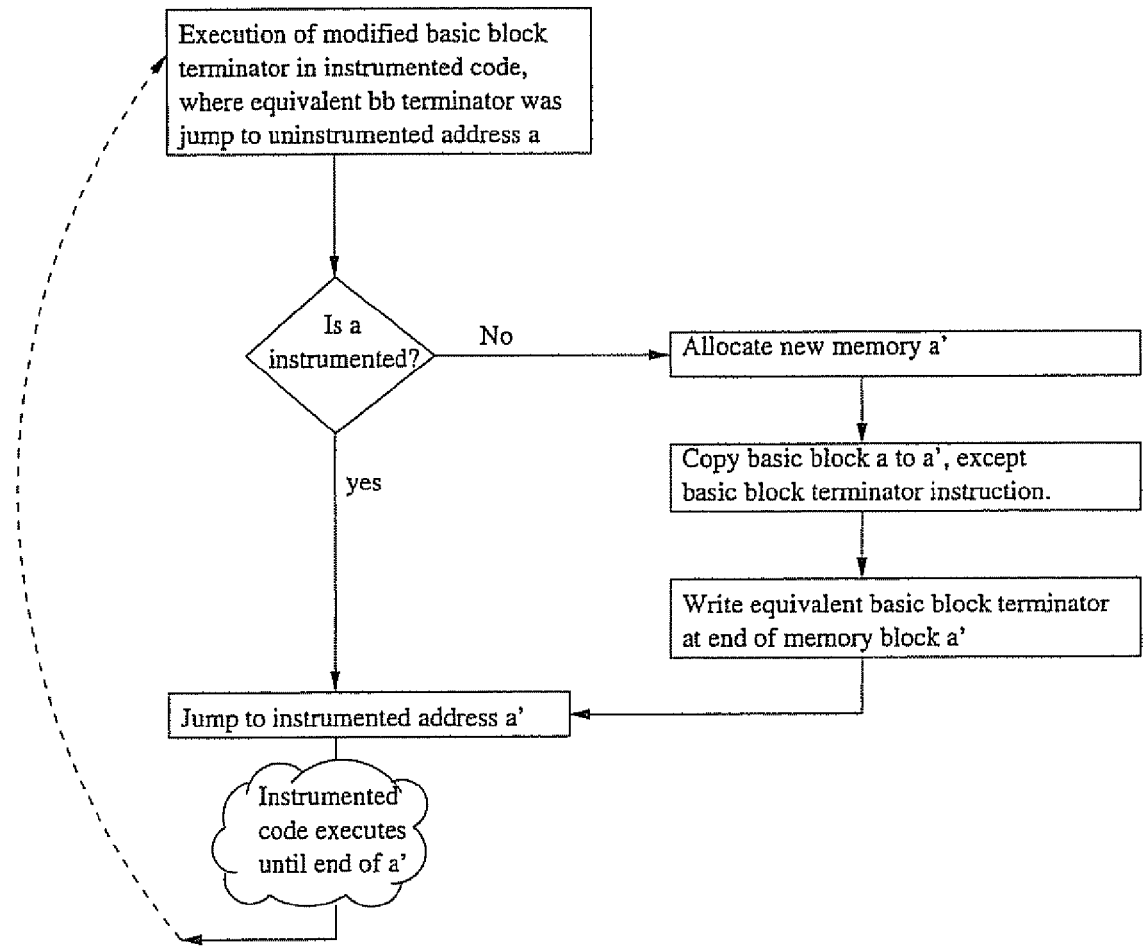
FIG. 4 shows a flowchart showing the instrumentation algorithm according to the present invention.

FIG. 4 shows a flowchart that illustrates the instrumentation algorithm. (Note that algorithm instrumented code in an 'on-demand' fashion, as that program executes; an ahead of time algorithm is also practical.)

Figure 5:
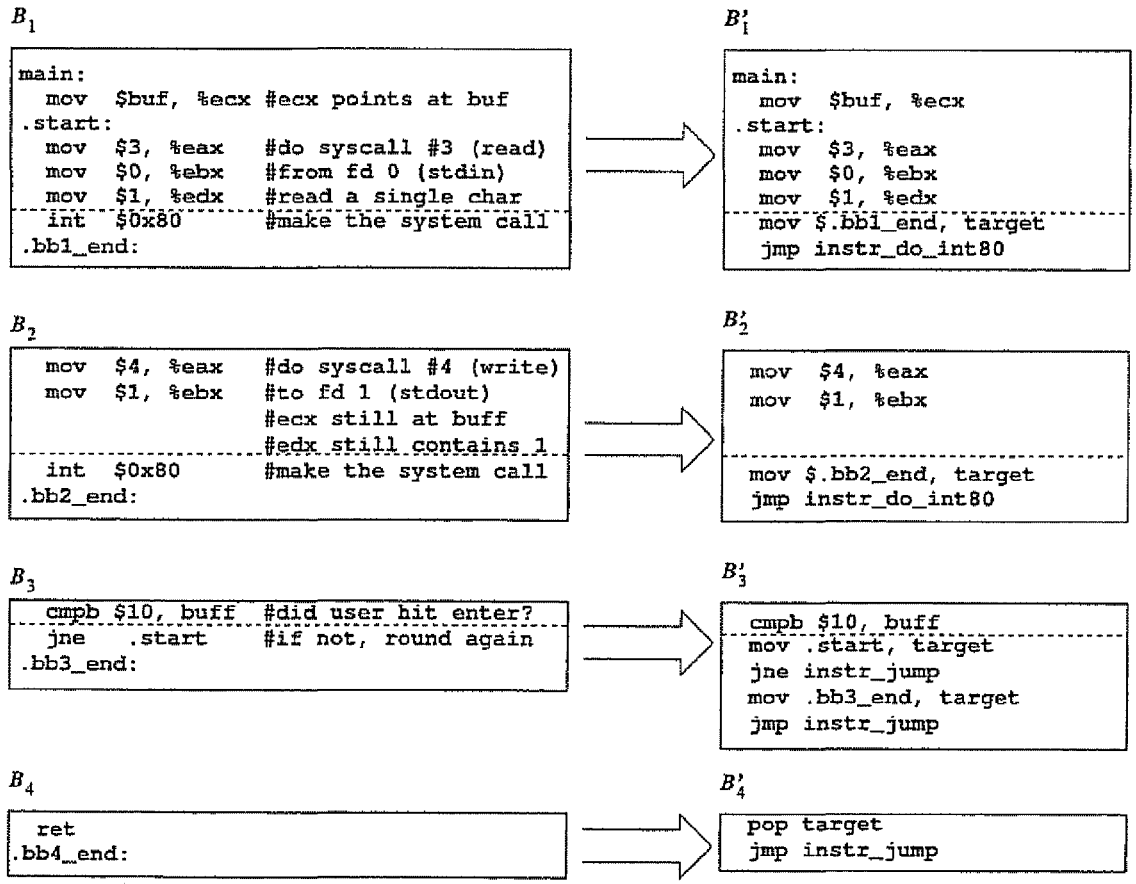
FIG. 5 shows the program P and its instrumented counterpart P' according to the present invention.

FIG. 5 shows the program in the previous example broken into its four basic blocks, and how those basic blocks are copied, and how the basic block terminator instruction for $B_n$ is replaced in $B'_n$ with one or more instructions that branch into the instrumentation code. The label target is used to store the uninstrumented address at which control would have proceeded in the uninstrumented version of the program; the instrumentation code will convert this to the address of the corresponding instrumented basic block and jump there.

The copying and modifying of basic blocks for instrumentation may be carried out statically before the program is executed, or may be done dynamically during the program's execution (i.e. on demand). Here, when the instrumentation code looks up the address of an instrumented basic block given the corresponding uninstrumented address, if the instrumented version cannot be found then the uninstrumented block is copied and the basic block terminator translated. (Our implementation uses the dynamic approach.)

We will next describe making replay deterministic. Using the instrumentation technique described in 3 we are able to remove all sources of nondeterminism from a process. We deal with each of the three kinds of determinism separately in subsections below.

Nondeterministic instructions: When the process executes for the first time, it is said to be in 'record mode'. Here, the results of all nondeterministic instructions (including system calls) are recorded in an event log. When playing a process forwards from a snapshot in order to recreate a previous state, the process is said to be in 'replay mode'. Here, the instrumentation code ensures that nondeterministic instructions are shortcut, and instead the event log is examined for the results of the corresponding nondeterministic instruction. The process' internal state is artificially reconstructed to reflect the results of the corresponding nondeterministic instruction produced when executed in record mode.

For example, when replaying a system call, this means restoring the system call's return code, as well as any of the process' memory that was modified as a result of the system call.

External state (operating system resources): Note that it is not necessary to reconstruct the process' external state when recreating the results of nondeterministic instructions, because the process' interaction with its external state is governed entirely through system calls. For example, consider a process running in record mode that opens a file for reading. The process will receive a file descriptor (also known as a file handle) which it will use with future calls to the OS to read from the file. The file descriptor is obtained and used with system calls. These system calls will be shortcut in the replay process. In effect, the instrumentation code will ensure that the replay process 'believes' that it has the file open for writing, but in fact it does not.

However, this is not true for OS resources that are visible from the process' internal state. As an example, consider a call to the OS to expand a process' address space (i.e. the memory it can access). Since this affects a resource which the replay process will access directly (i.e. memory), this system call must be reissued on replay to ensure that the effects of the nondeterministic instruction in question are faithfully replayed.

Note that memory mapped files are not treated specially; the entire contents of the file that is mapped must be recorded in the event log so that the effects of the memory map operation may be replayed. This is necessary because the memory mapped file may be in a different state (or may not even exist) during replay. However, it is possible to optimise this case by recording and replaying the on-demand mapping of pages of such files. Here, when a process maps a file in record mode, the instrumentation code ensures that the process does not really map the file, although the instrumented program is 'unaware' of this. This means that when the process attempts to access the pages of the file it believes are mapped, it will fault. The instrumentation code intercepts these faults, and maps the pages from the file, recording the contents of those pages in the event log. On replay, again the file is not mapped. However, this time when the replay process faults accessing the pages, the instrumentation code obtains the contents of those pages from the event log, and maps the pages and initialises them appropriately.

Asynchronous events: It is important that asynchronous events are replayed exactly as they occur during record mode. In record mode, we use instrumentation to obtain a sufficient level of control over when asynchronous events happen, so that these events may be faithfully reproduced in replay mode. This means that all asynchronous events are delivered to the instrumented program at basic block boundaries.

Asynchronous messages: Many modern operating systems provide a facility where an application can register an asynchronous event handling function. When the asynchronous event occurs, the operating system interrupts the program, transferring control directly to the handler function. When the handler function returns, the program proceeds as before interruption. This mechanism is often referred to as asynchronous signal delivery, or software interrupt servicing.

Such asynchronous events must be controlled to ensure that they are entirely repeatable. To achieve this, while running in record mode, the instrumentation code intercepts system calls to set up a handler for an asynchronous message. The request is manipulated such that the instrumentation intercepts asynchronous messages.

Figure 6:
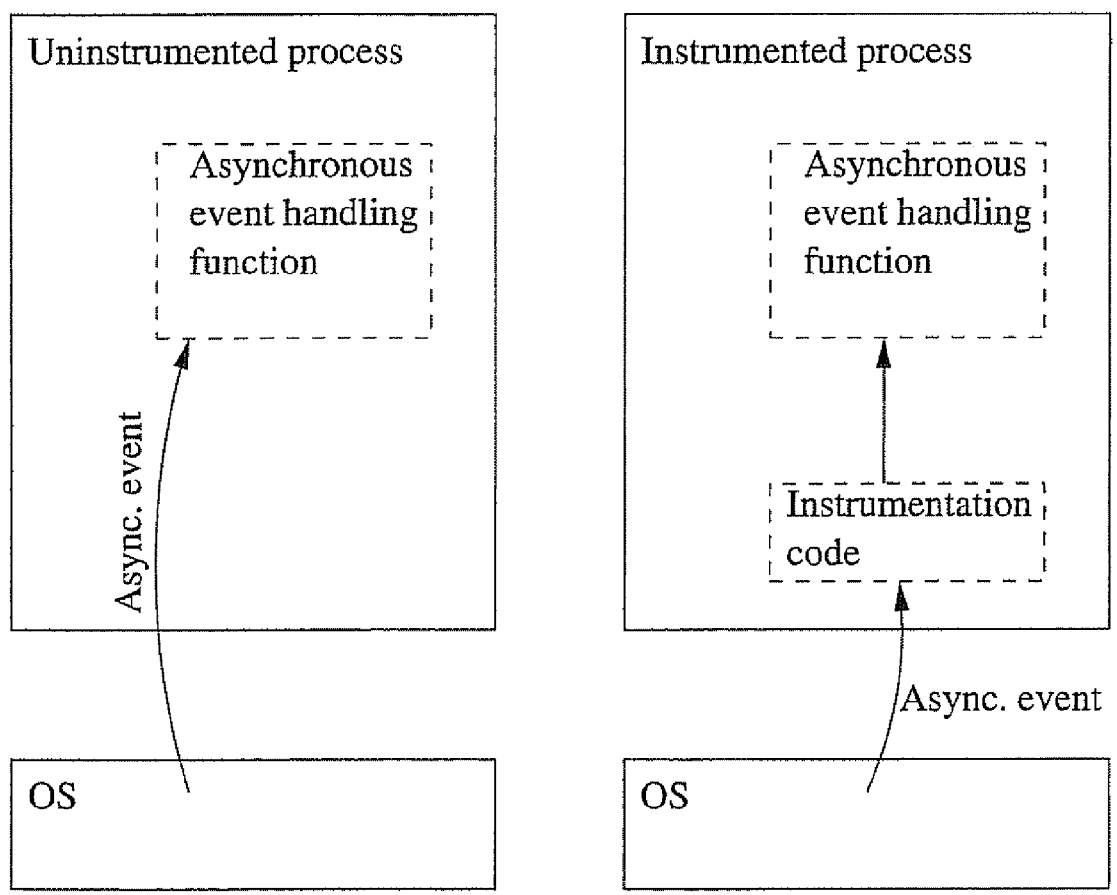
FIG. 6 shows interception of asynchronous events according to the present invention.

This is depicted in FIG. 6. The instrumentation code does not deliver the asynchronous notification directly to the program (i.e. it will not directly call the program's asynchronous event handler function). Instead the instrumentation code's event handling function will simply set a flag and return. At the end of each basic block boundary, the instrumentation code checks this flag, and if it is set will call the program's asynchronous event handler. In addition, the occurrence of the asynchronous event is recorded in the event log.

When replaying, asynchronous events are not delivered to the replay process at all. Instead, each time a basic block is executed, the event log is checked. If an event is scheduled for the current basic block, then the process' event handling function is called, thus faithfully replaying the asynchronous event.

As well as providing determinism, this mechanism also ensures that the asynchronous event handling function is instrumented when it is called. Otherwise, if the operating system is allowed to call the program's event handling function directly, then the original, uninstrumented code will be called, and we will 'lose' instrumentation.

Note that message-based systems such as Microsoft Windows use a system call to retrieve the next message from a message queue; the mechanism outlined in section 4.1 covers this case.

Threads: There are two main ways to implement multithreading within a process: kernel managed threads, and user managed threads. With user-managed threads, a user-mode library is responsible for threading. Thread preemption is performed by the library by responding to asynchronous timer events—hence any nondeterminism resulting from user-managed multithreading can be eliminated using the techniques described in the section on Asynchronous events.

However, most modern computer systems use kernel-managed threads. Here the operating system kernel is responsible for switching and otherwise managing threads, entirely without direct support from the application. There are several mechanism that can be employed to obtain deterministic kernel-managed threads.

One technique is to use the instrumentation code to implement 'virtual-kernel-managed threads', which involves the instrumentation code effectively providing user-managed threads, but letting the application 'believe' it is using kernel managed threads. Here, the system call to create a new kernel managed thread is intercepted by the instrumentation code, and subverted such that the instrumentation code creates a virtual kernel-managed thread within the single real kernel managed thread. The instrumentation code multiplexes all virtual kernel-managed threads onto a single real kernel-managed thread. This means that thread switching is under control of the instrumentation code, and can be made entirely deterministic. The instrumentation code can provide preemptive multithreading by effecting a virtual kernel-managed thread switch every n basic blocks (e.g. where n=10,000).

Here, care must be taken to ensure deadlock is avoided. If a virtual kernel-managed thread blocks waiting for the action of another virtual kernel-managed thread, since both virtual threads are running within a single real thread, deadlock can result. (A particularly common example of this problem is when two virtual kernel-managed threads contend on a mutual exclusion primitive; if care is not all virtual kernel-managed threads will deadlock). One way to avoid deadlock on a UNIX system to periodically arrange for the process to be delivered an asynchronous timer signal, such that blocking system calls will be interrupted, returning EINTR.

An alternative mechanism involves letting the program create kernel-managed threads as normal, but subverting the thread creation such that the instrumentation code has control over which thread is executing at which time. This might involve modifying the threads' priorities such that the instrumentation code can control which thread the OS will execute, or perhaps artificially blocking all but one thread at a time by e.g. having it wait on a semaphore.

Shared memory: If a process being debugged shares memory with another process, it is possible to exploit the operating system's memory protection mechanism to provide deterministic replay.

Suppose that there are two processes, A and B, that share some portion of memory M, such that both processes have read and write permissions to access M. Process A is being run under instrumentation for bidirectional debugging, but process B is not. The shared memory M is initially mapped such that process B has read-only access, and A has full access. We describe this situation as process A having ownership of memory M. Any attempt by process B to read memory M will succeed as normal, but any attempt by process B to write to M will result in a page fault. This fault is responded to by memory M being mapped read/write to process B, and unmapped completely from process A. We refer to this process B taking ownership of the memory. Here, any attempt to access M (either for reading or for writing) by A will result in a page fault. This is responded to by reverting ownership of M to A, but in addition sufficient state being stored in the event log to replay the changes to M made by B. That is, the difference of the memory M between the point when A last had ownership of that memory and the current time is stored in the event log.

When replaying, the difference in memory is retrieved from the event log and applied at the appropriate time. Thus the effect on A of B's asynchronous modification of memory M can be replayed deterministically.

Note that the above scheme can easily by generalised so that process B is actually a group of one or more processes.

An alternative approach is to record in the event log every memory transaction performed by on the shared memory M. This has the advantage of being a simpler implementation, but depending on the usage of the shared memory may result in the recording of an unacceptable amount of state in the event log, as well as adversely affecting temporal performance.

We will next describe implementation and structure of the event log. As we have seen, there are several kinds of events that need to be recorded in the event log: Nondeterministic instruction results (including the return codes and memory modifications made by system calls), Asynchronous events (including asynchronous signal delivery and thread switches), and Shared memory transactions.

The memory used to store the event log must be accessible by the process in record and replay mode. This means that if the UNIX fork facility is used to snapshot processes, then the memory used to store the event log must be shared between each process created with these forks.

The event log itself is stored as a linked list, where each node contains the type of event, data sufficient to reconstruct that event during replay, and the basic block count at which that event happened. (An event's basic block count is the number of basic blocks that have been executed in the original record process when the event occurs. This means that there is a correlation between time t and the basic block count; or more precisely, since we structure things such that all nondeterministic events happen at a basic block boundary, the basic block count—not seconds or nanoseconds—is the fundamental unit of t.)

When in replay mode, between each basic block it is necessary only to inspect the current basic block count, and compare it with the basic block count of the next nondeterministic event in the event log. In the common case that the current basic block count is less than the basic block count for the next nondeterministic event, the next basic block can be executed without further delay.

We will next describe searching history. In general, it is more useful for a bidirectional debugger to be able to search history for a particular condition, as opposed to wind a program back to an absolute, arbitrary time. Some examples of the kinds of conditions it is useful to be able to search are:

The previously executed instruction
The previously executed source code line
The previously executed source code line at the current function call depth
The call site for the current function
The previous time an arbitrary instruction or source code line was executed More generally, it is useful to be able to rewind a debugged program to the previous time an arbitrary condition held, such as a variable containing a given value, or even completely arbitrary conditions, such as some function (without side-effects) returning a particular value.

We have implemented an algorithm to search an execution history for such arbitrary conditions. The most recent snapshot is taken, and played forward testing for the condition at the end of each basic block. Each time the condition holds, the basic-block count is noted (if a basic-block count is already recorded because the condition held earlier, it is overwritten). When the history is replayed up to the current position, the most recent basic block at which the condition held will be stored. If no basic block count has been recorded because the condition did not hold since the most recent snapshot, then the search is repeated starting from the next most recent snapshot, up to the most recent snapshot. That is, suppose that the debugged program is currently positioned at basic block count 7,000, and there are snapshots at basic block counts 0; 2,000; 4,000; and 6,000. We start at the snapshot at count 6,000 and play forwards until count 7,000, testing for the condition between each basic block. If the condition never holds between counts 6,000 and 7,000, then we rewind to the snapshot taken at 4,000, and play that forwards to 6,000, searching for the event. If the condition still isn't found to hold, we check 2,000-4,000, and so on.

Note that this algorithm will not work reliably with the instrumentation technique described in section 3 if searching for the most recent time at which a variable held a particular value. This is because a variable's value may change to and then from the required value entirely within a basic block. To overcome this, there is a trivial enhancement to the instrumentation technique described in section 3—each memory write operating is considered a basic block terminator. (This approach can also be used to ensure that a program that has gone hay-wire does not write over the event log or other instrumentation datastructures.) This form of instrumentation will operate less efficiently than the one described in section 3; however should the performance become problematic, it is possible to run with both forms of instrumentation, switching between the two as necessary.

(Note that the algorithm described in this section does work reliably when searching for particular values of the program counter with the instrumentation technique described in section 3.)

We have described a bidirectional debugging mechanism that can be conveniently implemented on most modern operating systems. A process can be rewound and its state at any time in its history can be examined. This is achieved by regularly snapshotting the process as it runs, and running the appropriate snapshot forward to find the process' state at any given time. Nondeterminism is eliminated using a machine code instrumentation technique.

Our implementation for the Linux operating system is responsive and pleasant to use, and promises to greatly reduce debugging times for particularly subtle and difficult bugs. We have also implemented a searching technique that permit the most recent time that an arbitrary condition holds in a process' history.

Our technique of instrumenting machine code rather than source-level analysis is particularly important, because it means the system copes with bugs where the compiler-dictate control flow is subverted (e.g. overwriting a function's return address on the stack).

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A non-transitory computer readable medium having computer executable instructions for implementing a backwards debugger configured to implement a method of returning to a state in the history of execution of a computer program, said state comprising a set of values of one or more of registers of a processor on which the program is running, working memory space to which the program has access and operating system resources allocated to the program, the method comprising:

identifying in machine code representing said program, instances of machine code instructions associated thread switch events;

modifying said program machine code to execute a program instrumentation set of machine code instructions to handle said thread switch events;

executing said modified program machine code, storing a time series of said states during said executing;

restoring a said stored state; and executing said modified program machine code forward in time starting at said restored state to return to said state in said program history of execution;

wherein said modifying comprises:

partitioning said program machine code into a plurality of blocks each comprising a copy of a part of said program machine code and configured to execute said program instrumentation code after execution of the respective block; and replacing an instruction to an operating system to create a new thread with machine code to control creation and execution of said new thread; and wherein said control code counts a number of said blocks which have been executed to control said new thread execution.

2. The non-transitory computer readable medium as claimed in claim 1 wherein said modifying comprises replacing an instruction to an operating system to create a new thread with machine code to control creation and execution of said new thread.

3. The non-transitory computer readable medium according to claim 1, wherein the program comprises a multi-threaded program, wherein said modifying comprises adding machine code instructions to each thread to, when said thread is executing, acquire a mutex common to all threads of the program and to release said mutex when execution of said thread has finished, and when said executing comprises, when a thread switch occurs, storing information corresponding to which thread executes following the thread switch.

4. The non-transitory computer readable medium according to claim 3, wherein during said executing and storing said thread activity is controlled by the operating system.

5. The non-transitory computer readable medium according to claim 1 wherein said computer program comprises a multi-threaded program, and wherein said modifying comprises modifying program machine code for each thread to execute a program instrumentation set of machine code instructions to handle said thread switch events to acquire a mutex common to all threads when said thread is executing and to release said mutex when execution of said thread finishes and wherein said storing a time series of said states during said executing further comprises, when a thread switch occurs, storing thread switch information corresponding to which thread executes following said thread switch.

6. The non-transitory computer readable medium as claimed in claim 1 wherein said instrumentation code includes code to execute a machine code instruction having a non-deterministic result and to immediately afterwards store a said state of execution of said program.

7. The non-transitory computer readable medium as claimed in claim 1 wherein each said block starts immediately after a jump instruction, and wherein said modifying includes modifying each said jump instruction to point to a location within a said copied block.

8. The non-transitory computer readable medium as claimed in claim 1 wherein an end point of each said block is defined by the occurrence of one of a jump instruction and a thread switch instruction.

9. The non-transitory computer readable medium as claimed in claim 1 wherein said storing of states comprises storing results of said thread switch events; and wherein said restoring comprises retrieving said stored results of said thread switch events.

10. A non-transitory computer readable medium having computer executable instructions for implementing a backwards debugger, the debugger comprising:
    code to record data identifying a state of a program for backwards debugging whilst said program is running in a forwards direction; and
    code to provide an effective backwards debugging function by running said program forward from a said state; and
    wherein said debugger further comprises:
    code to handle non-deterministic events in said program, said non-deterministic events comprising one or more events selected from the group consisting of: a thread switch event; an asynchronous event; and a data read from memory shared with a second program, process or device;
    wherein said data recording code is configured to modify said program to add instrumentation code such that a system call involving running a kernel thread at the same time as a said program thread is running is instructed to drop said debugging mutex and write data into an event log rather than a memory location defined by the program, and such that on return from said system call said mutex is taken and then said data written into said event log is written into said memory location.

11. The non-transitory computer readable medium as claimed in claim 10 wherein said non-deterministic events comprise thread switch events, and wherein said non-deterministic event handling code comprises code to ensure that each thread in said program capable of running simultaneously has a debugging mutex such that only one of said threads, excluding any kernel threads, runs at any one time; wherein said data recording code is configured to modify said program to add instrumentation code to each said thread, said instrumentation code comprising an instruction to drop said mutex followed by an instruction to take said mutex; and wherein said data recording code is configured to modify said program to add instrumentation code to record thread-related data for said program state in an event log on occurrence of a mutex take; and wherein said thread-related data comprises data identifying the thread to take said mutex.

12. The non-transitory computer readable medium as claimed in claim 11 wherein said code to provide an effective backwards debugging function comprises code to synthesise a thread switch using said recorded thread-related data.

13. The non-transitory computer readable medium as claimed in claim 11 wherein said running of said program comprises running on a multi-processor system, and wherein said debugging mutex ensures that only a single processor of said multiprocessor system is operating at a time to execute the program being debugged; wherein said data recording code is configured to modify said program to add instrumentation code to drop said mutex at a point in said program where information may be requested from another thread, wherein said point comprises a blocking system call.

14. The non-transitory computer readable medium as claimed in claim 10 wherein said instrumentation code is further to record a copy of non-deterministic data read in a data read event into an event log.

15. The non-transitory computer readable medium as claimed in claim 10 wherein said non-deterministic events comprise asynchronous events, wherein said program includes an asynchronous event handling instruction to perform an action in response to said asynchronous event, and wherein instrumentation code is further to record said event and a time of said event in an event log prior to performing said action; and wherein said non-deterministic events include data read events from said memory shared with a second program, process or device, wherein said data recording code is configured to modify said program to add instrumentation code to record said read data in an event log, and wherein said code to provide an effective backwards debugging function comprises code to read from said event log to replay a said data read event.

16. A non-transitory computer readable medium having computer executable instructions for implementing a method of going to an arbitrary point in computer program code execution of a processor connected to a memory, said arbitrary point being determined by a selection criterion, the backwards debugger, in operation:
    partitioning the computer program code into first portions of code comprising instructions for linear computer program code execution and second portions of code comprising instructions for non-linear computer program code execution;
    executing said computer program code by executing a said first portion of code and by evaluating to which point in the computer program code a said second portion of code following said executed first portion of code would, if executed, transfer execution, and continuing execution of said computer program code at that point;
    storing at least one snapshot of computer program code execution during said executing, said snapshot comprising at least one of register values of the processor and memory values of the memory; and
    selecting a said snapshot, restoring register values of the processor and memory values of the memory to those in the snapshot and continuing execution from that point until the selection criterion has been met, to go to said arbitrary point; and
    handling non-deterministic thread switch events by:

modifying code of said computer program code to add mutex drop followed by mutex take instructions to each thread of said program;

logging data identifying a new thread to take said mutex following a said mutex drop; and recreating said thread switch events during backwards debugging using said logged data.

* * * * *